United States Patent [19]

Minerd et al.

[11] Patent Number: 5,459,453
[45] Date of Patent: Oct. 17, 1995

[54] INTEGRATED I/O INTERFACE DEVICE AND CONNECTOR MODULE

[75] Inventors: Timothy M. Minerd, Pittsford; Benjamin D. Brown, Ontario; Alan K. Robertson, Rochester, all of N.Y.

[73] Assignee: Xerox Corporation, Stamford, Conn.

[21] Appl. No.: 812,336

[22] Filed: Dec. 23, 1991

Related U.S. Application Data

[63] Continuation-in-part of Ser. No. 262,849, Oct. 26, 1988, abandoned.

[51] Int. Cl.[6] ................................................. G05B 23/02
[52] U.S. Cl. .............. 340/825; 340/825.06; 340/825.07
[58] Field of Search .................. 371/20.2; 370/15, 370/92, 24, 29, 32, 37; 361/392, 460; 439/68; 340/825.06, 825.07, 825.52, 825.54, 310 R, 310 A, 825.08, 825

[56] References Cited

U.S. PATENT DOCUMENTS 4,227,181  10/1980  Brittain .
4,293,947  10/1981  Brittain .
4,774,704   9/1988  Gass et al. ................................ 370/29
5,200,743   4/1993  St. Martin et al. ................. 340/825.07

FOREIGN PATENT DOCUMENTS 0150592  7/1989  European Pat. Off. .

Primary Examiner—Ulysses Weldon
Attorney, Agent, or Firm—Ronald F. Chapuran

[57] ABSTRACT

An interface connector device for interconnecting a plurality of input/output devices including a signal bus connected to a control and to the input/output devices for multiplexing the signals between the control and the input and output devices, the bus interconnecting a plurality of interface and connector devices, and each of the interface and connector devices including address recognition circuitry as well as programmable configuration selection logic to configure the connector device to respond to a variety of input/output devices. In addition, the signal bus and connector devices are adapted to recognize and convey various levels of signals, for example, different voltage levels representing control information, framing signals, and diagnostic command signals.

19 Claims, 9 Drawing Sheets

INTEGRATED I/O INTERFACE DEVICE AND CONNECTOR MODULE

This application is a Continuation-in-Part of application Ser. No. 07/262,849 filed Oct. 26, 1988 now abandoned.

BACKGROUND OF THE INVENTION

The invention relates to an integrated input/output interface device and connector module, and more particularly, to a connector module adapted for multi-level operation and the multiplexing of input/output data.

It is well known in the prior art that discloses connectors having a logic chip or circuitry within the connector itself. For example, U.S. Pat. No. 4,420,794 discloses key device carrying an integrated circuit chip for dual in-line package that permits connecting the chip into a circuit board such as drum and exterior openings of the housing or cabinet carrying the circuit board. U.S. Pat. No. 3,410,001 discloses a visual display panel in a number of digital-logic circuit devices capable of both mechanical and electrical connections to the panel and circuit connections for making selected logical circuit interconnections between the digital logic devices displayed on the panel. U.S. Pat. No. 4,557,540 discloses a program socket including a printed circuit board for tracing transposing pin positions between the input and output sides of the socket. U.S. Pat. No. 4,206,962 discloses an electrical connector having electronic components contained within the connector itself providing data transfer from closely spaced pin arrays to outside related equipment while providing a logic interconnect capability inside the connector itself. U.S. Pat. No. 4,602,838 is another example of a connector/electronic key assembly.

U.S. Pat. No. 4,607,170 relates to an interface between data communications equipment and data terminal equipment and in particular discloses a pair of pin connectors having a housing and multiple pins and a multiple conductor cable interconnecting the pins in the connectors, and an active signal circuit enclosed within the housing of one of the connectors wherein the signal circuit includes means for generating a time or clock signal for timing or clocking the flow of data signals to the interconnection device. U.S. Pat. No. 4,609,241 is another example of a programmable socket. U.S. Pat. 4,620,762 is another example of an electronic key assembly.

A difficulty with the prior art devices is the lack of flexibility and the difficulty in extending the capability of the connector without costly additions of hardware and redesign such as a need to add an increasing number of interconnecting lines. Another difficulty is the inability to carry different modes or levels of signals within the connector or to be able to adapt the connector to different classes of input/output devices such as analog and/or digital or to different configurations, such as variable input interfaces or output drivers.

It is an object of the present invention, therefore, to provide a new and improved integrated input/output connector IIOC module that is adapted for multiplexing input and output data, that is adapted to respond to different levels of input and output signals and is capable of being adapted to different configurations such as the interconnection to combinations of analog and digital devices. It is another object of the integrated I/O and connector device to minimize the number of electrical conductors (wires) required in a machine and therefore improve the reliability and lower the cost of the electrical subsystem. Another object of the IIOC module is to provide smaller Input/Output interface building blocks so that a higher degree of commonality and maximum flexibility for expansion within the electrical subsystem can be achieved. Further advantages of the present invention will become apparent as the following description proceeds and the features characterizing the invention will be pointed out with particularity in the claims annexed to and forming a part of this specification.

SUMMARY OF THE INVENTION

Briefly, the present invention is an interface connector device for interconnecting a plurality of input/output devices including a signal bus connected to a control and to the input/output devices for multiplexing the signals between the control and the input and output devices, the bus interconnecting a plurality of interface and connector devices, and each of the interface and connector devices including programmable address and recognition circuitry as well as programmable configuration selection logic to configure the connector device to respond to a variety of input/output analog/digital devices or to configure to distinct characteristics such as input or output interface capability. In addition, the signal bus and connector devices are adapted to recognize and convey various levels of signals, for example, different voltage levels representing control information both analog and digital, frame/synchronization signals, and diagnostic enable signals.

DESCRIPTION OF THE DRAWINGS

For a better understanding of the present invention, reference may be had to the accompanying drawings wherein the same reference numerals have been applied to like parts and wherein.

DETAILED DESCRIPTION OF THE INVENTION

Figure 1:
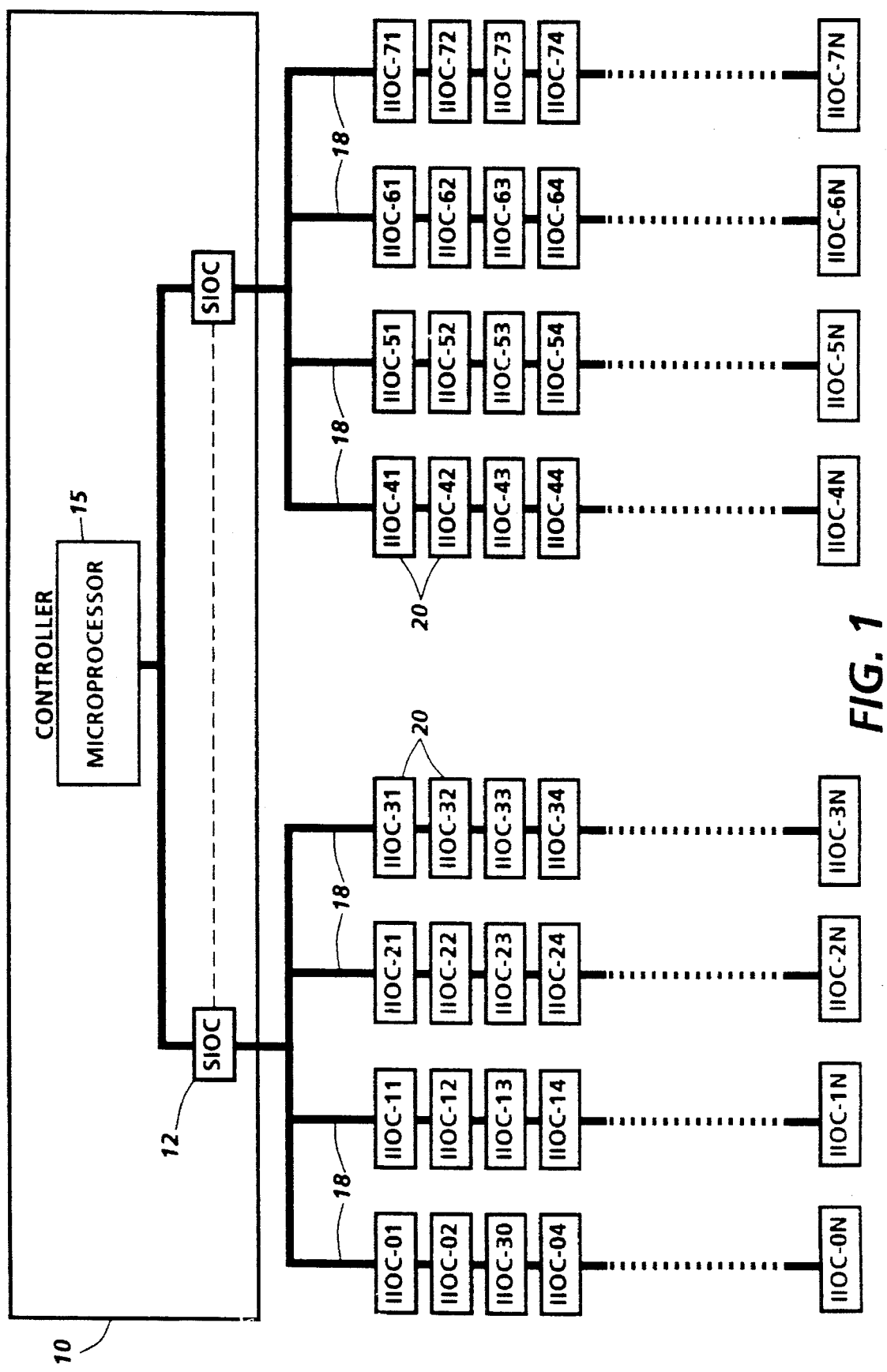
FIG. 1 is a connector system in accordance with the present invention.
Figure 2:
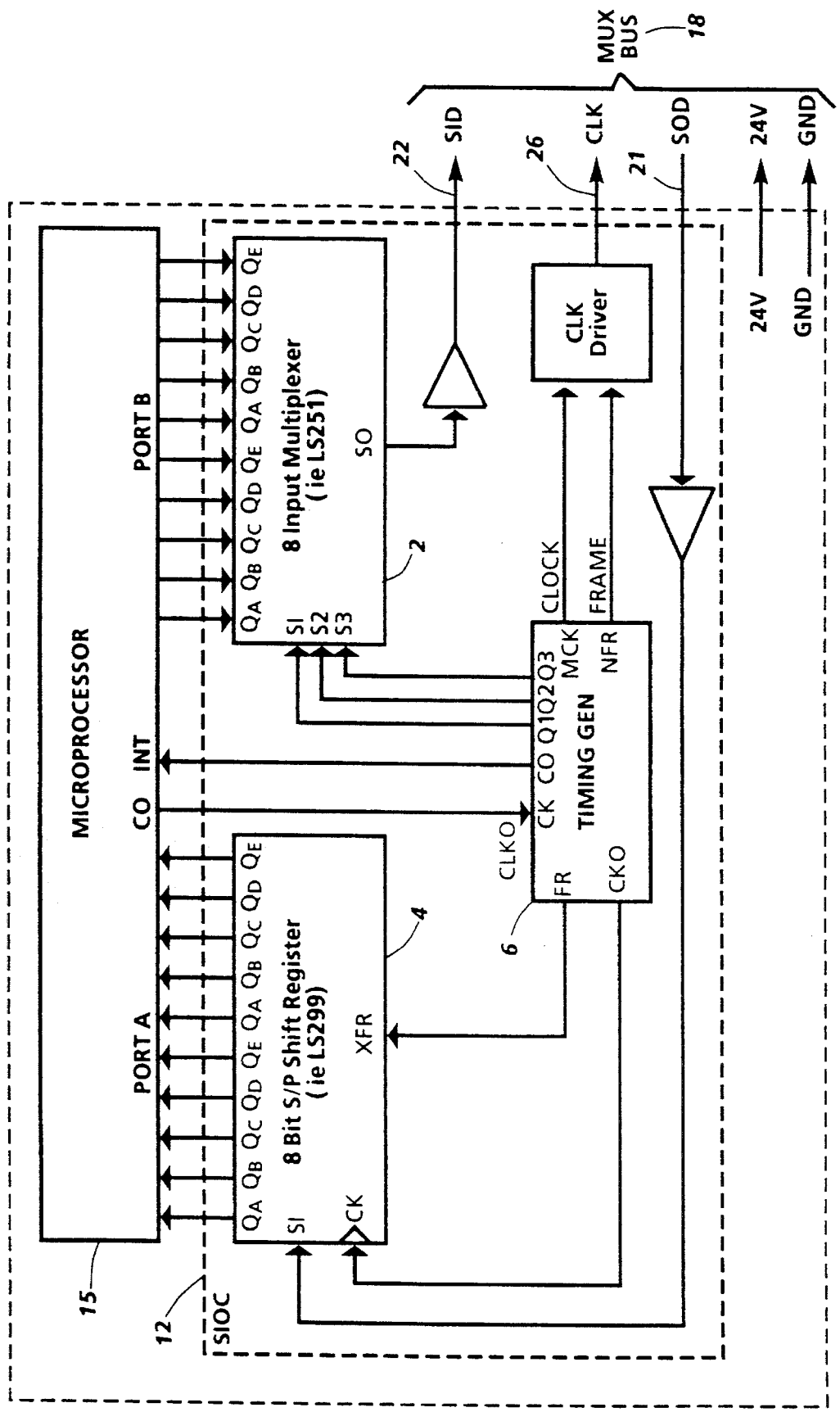
FIG. 2 is a diagram of the controller in accordance with the present invention.

With reference to FIGS. 1 and 2 there is shown a schematic of a typical system using IIOC (Integrated Input/output Connector) modules. The five wire multiplexed buses 18, FIG. 1, are then connected in parallel to each IIOC module 20 therefore requiring only five wires for the 'N' modules on each bus. FIG. 1 shows eight five wire buses 18 connected to the 'N' IIOC modules 20.

In the preferred system implementation the controller 10 consists of a microprocessor 15 (FIG. 2) that interfaces to the IIOC modules 20 (FIG. 1) through a device called the SIOC 12. The SIOC in its basic form is a parallel to serial converter 2, and serial to parallel converter 4, with the necessary timing logic 6 to generate the framing pulse and clock signals. The SIOC 12 performs the function of accepting parallel data from the microprocessor 15 and sequentially placing the data onto the outgoing data line SID 22, and collects the incoming serial data SOD 21, and then presents that data in parallel to the microprocessor 15. Thus the -SIOC 12 frees the microprocessor from the time consuming task of performing the serial to parallel and parallel to serial conversions and generating the required timing to drive the busses 18. In a high speed or high performance system this task would be too much of a real time burden but in lower speed or low performance system this task could be performed by the microprocessor 15 alone without SIOC 12.

Figure 3:
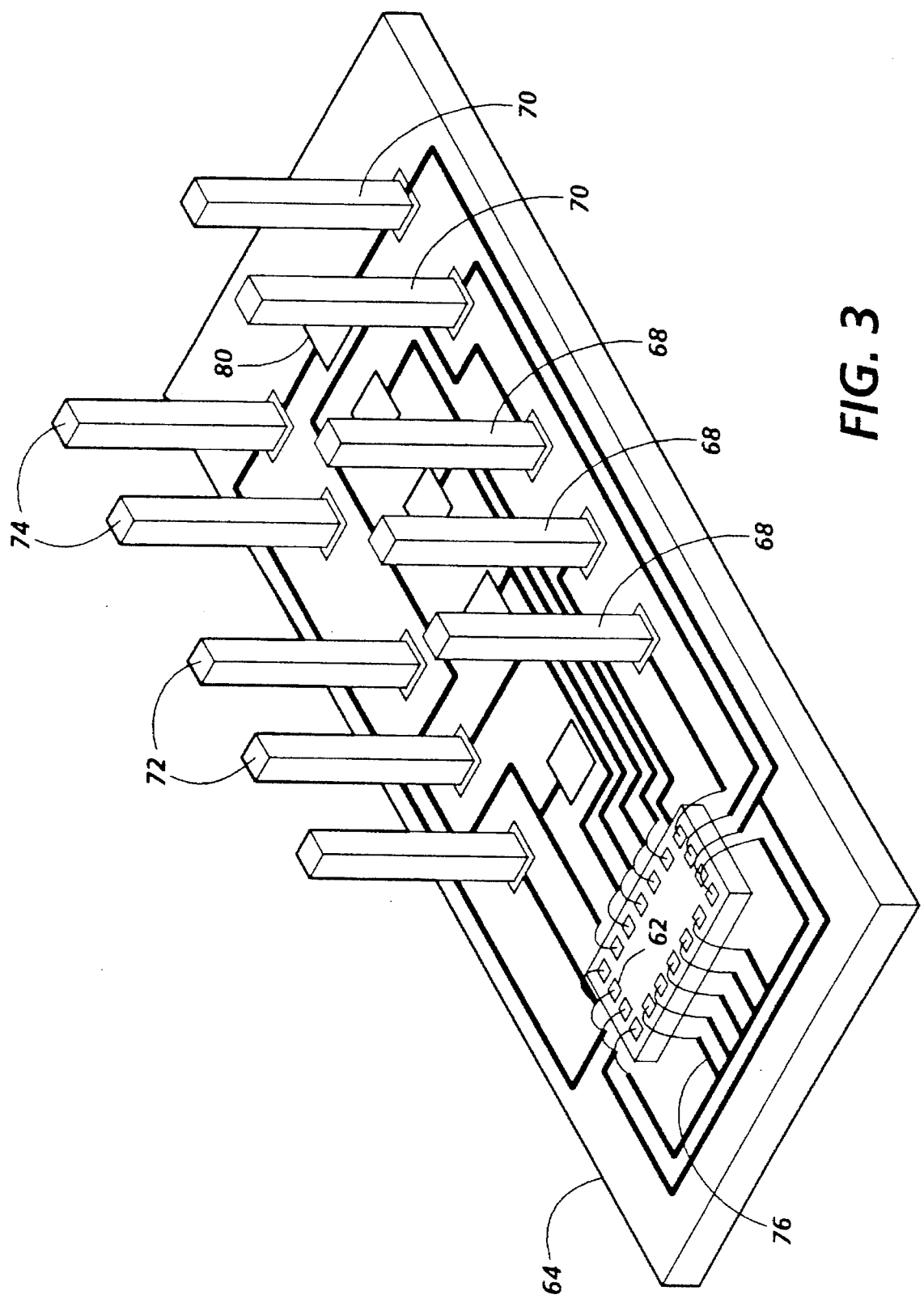
FIG. 3 is an example of the electrical interconnection of an integrated connector input/output module in accordance with the present invention.
Figure 4:
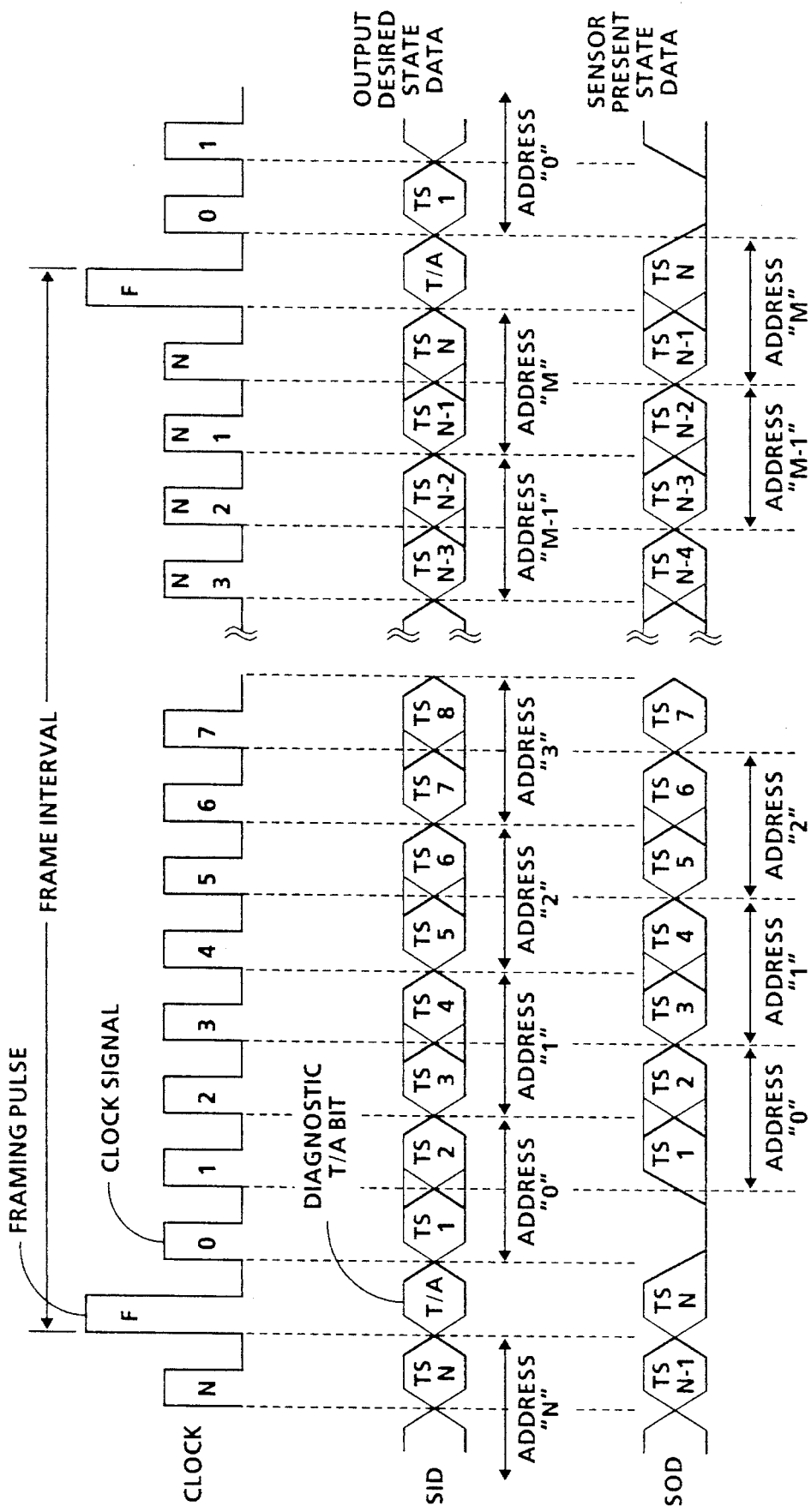
FIG. 4 is a typical connector device housing.

With reference to FIGS. 3 and 4, there is illustrated a "Chip on Board" substrate 64 configuration and module housing of an IIOC module 20 in accordance with the present invention. In particular, a substrate 64 supports the Integrated Circuit (IC) chip 62. The chip 62 is electrically connected to the various conductive paths and to input plugs 68 and 72 and output plugs 70 and 74. Each of the three pronged input plugs 68 and 72 is connected via a suitable connecting device to an input device and each of the output plugs 70 and 74 is connected via a suitable connecting device to an output driver. The five wire bus 18 is suitably interconnected to the chip 62 via the connector pads 80 and the address and configuration programming is via the conductive paths 76 as illustrated. The conductive paths 76 are used to program the address and configure the IIOC module. Substrate 64 is suitably located inside housing 84.

FIG. 4 illustrates a housing generally shown at 84 having a generally rectangular or any other suitable shape with suitable slots or orifices such the slots 86 for connecting the 5 wire bus 18 to the integrated circuit chip disposed within the housing. Openings 88 and 90 are also provided in the wall of the housing 84 or any other suitable wall for receiving connectors or plugs to electronically interconnect the various input/output devices to the integrated circuit.

Figure 5:
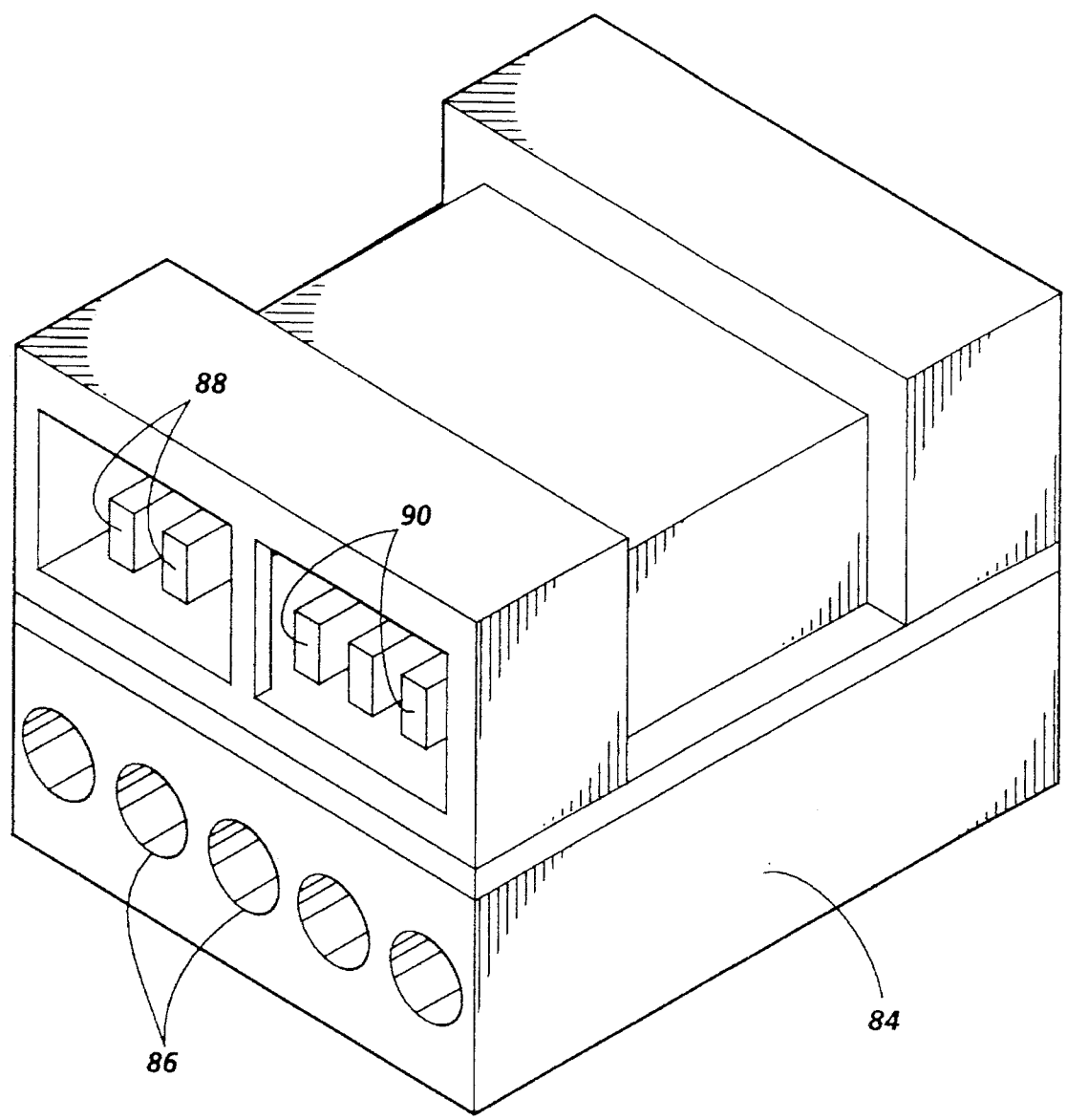
FIG. 5 is a timing diagram illustrating the multiplexing of data signals in an integrated connector in accordance with the present invention.
Figure 6:
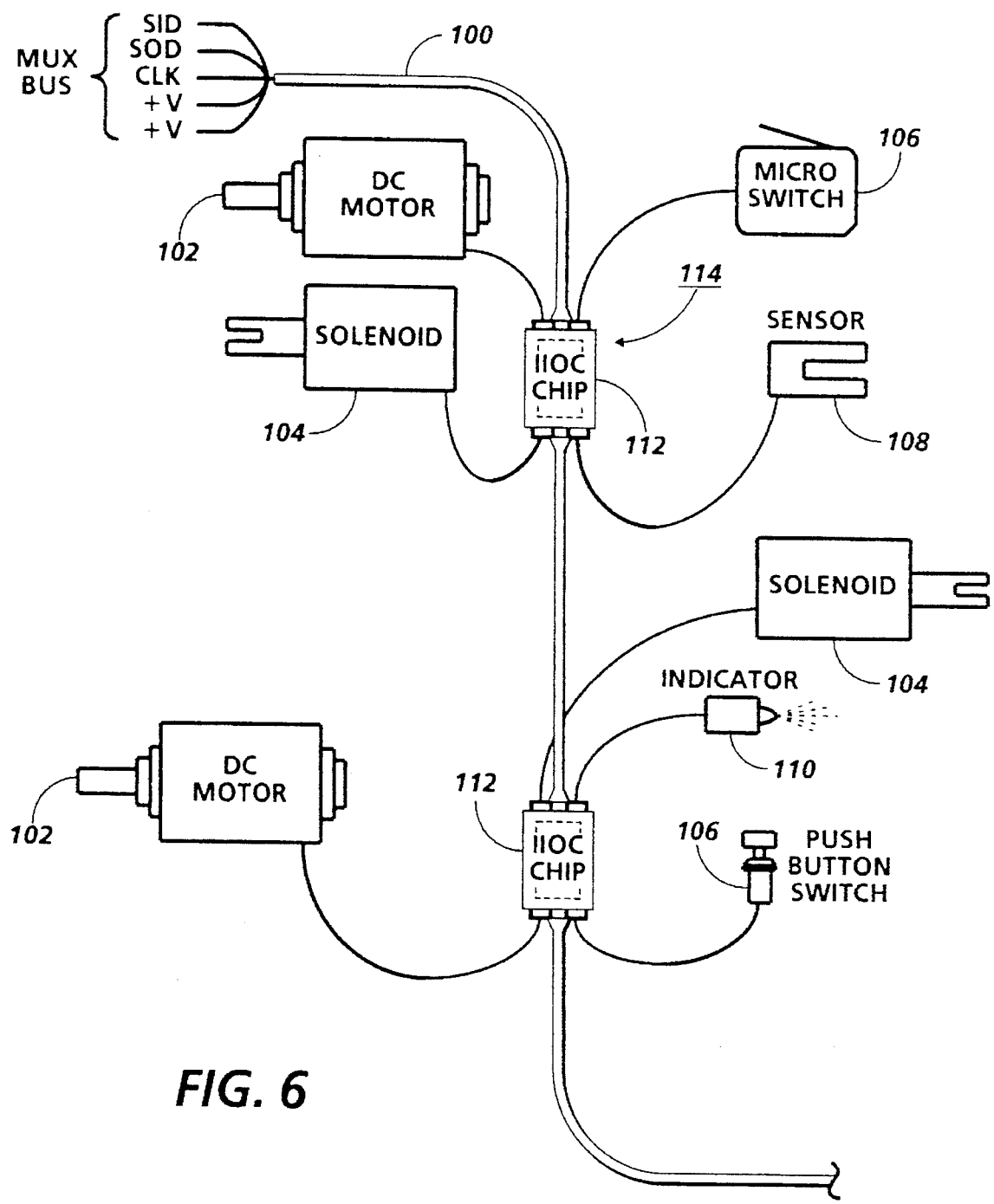
FIG. 6 is a typical harness illustrating connections to externally driven loads in accordance with the present invention.

With reference to FIG. 5, the five wire bus includes the time division multiplexed (TDM) signals and power connectors. The integrated circuit housed within the IIOC module provides the necessary logic to derive from three TDM signals (SID, SOD, and CLK) the desired state of its output devices and to report back the current state of its input devices. Power for the integrated circuit and for the loads driven by the IC is provided by two additional wires that are common to all IIOC's connected to the TDM communications lines. Thus a five wire bus is formed, know as the MUX BUS, that is routed to 'N' identical IIOC's that are distinguishable from each other only by their address and configuration (see FIG. 6). The IIOC's address and configuration (see FIGS. 7 and 8) are programmable and can be set at the time the IIOC device is installed on the MUX BUS.

The IIOC module can be a digital type device or an analog type device. In the analog configuration (FIG. 8) the IIOC can be used to provide a voltage reference to set the output voltage or current of a xerographic power supply as well as to monitor the setting for variations from the setting. In the digital configuration (FIG. 7) the IIOC has the capability of providing required higher power drive signals. For example, with reference to FIG. 6, there is illustrated typical module harnessing, In particular, connections to electro-mechanical devices such as solenoids 104 and motors 102 as well as the required interface to detect the state of input devices such as mechanical switches 106 and optical sensors 108.

Again, referring to FIG. 2, the TDM communications between the SIOC 12 and the IIOC modules takes place on a pair of serial lines, one carrying the output states (SID 22, FIG. 2) out to the modules and one carrying the current input states,(SOD 21) back to the controller. Both wires are synchronized with a third wire called the CLK signal 26 (see FIG. 5). The CLK signal 26 is a multilevel signal that is the combination of both the framing pulse 29 and the clock signal 31 and is common to all modules. The framing portion of the CLK signal indicates the beginning and end of the transmission of a new frame of data, and the clock signal portion of the CLK signal indicates the beginning and end of each individual packet of data being sent and received from the modules. In a small system the TDM communications process is done in conjunction with all 'N' IIOC modules which are all connected in parallel to the same set of serial lines and CLK signal. In a larger system there may be multiple SID and SOD lines but the CLK signal 26 can remain common if desired or be different for each bus if desired.

Communication to the IIOC modules with reference to FIG. 2 begins by the SIOC 12 raising the CLK signal 26 to the reset level for one half clock cycle. With the CLK signal 26 at the reset level all IIOC modules control logic 33 in FIG. 7 simultaneously detect this state and force their address detection logic to the reset state. On the next rising edge of the CLK signal data transmission is begun by the SIOC 12 forcing the first packet of data on the SID 22 line for the IIOC module with the first address. Therefore the module with the first address samples the SID 22 line data on the falling edge of the CLK signal 26 , and in doing so captures the required state of its first output device. Using the falling edge of the clock allows the data being transmitted to settle out before being sampled by the IIOC device being addressed.

The value sampled from the SID 22 line indicates whether the output is to be turned "on" or "off" in the case of a digital device, or what level it is to be achieved in the analog device. In the digital device case, this value is stored in a logical latch (401, FIG. 8) which in turn drives the output driver to the desired state. For an analog IIOC device the voltage sampled from the SID line is stored in a sample and hold device 400 (.) On the next rising edge of the CLK signal 26 the controller replaces the first packet of data that was being sent with the next (second) packet of data to be sent. Again the data is sampled by the IIOC module control logic 33 on the falling edge of the CLK signal 26. This process continues until all data is sent to each module on the MUX BUS (a frame).

To determine which packet of data is to be captured, the control logic 33 each module counts positive CLK signal 26 transitions and when the same number of positive CLK transitions occur that correspond to the module address, the control logic 33 begins sampling the SID 22 line for the appropriate number of packets of data corresponding to its configuration. When all data has been sent to all modules the SIOC 12 again raises the CLK to the reset level indicating the end of that frame of data and the beginning of the next. These same frames of data are repeatedly sent to the modules in what are known as refresh cycles that insure that the remote modules maintain the proper state in the presence of noise and other disturbances.

TDM communications from the modules control logic 33 to the SIOC 12 also begins with the CLK signal 26 at the framing level. As a module detect its address, as previously discussed, it enables (powers up) its first input device for one cycle of CLK signal 26 to allow the input device to settle out before sampling the state of the device. At the end of this CLK 26 cycle (the next rising edge) the input state is sampled by the control logic 33 and stored internally and the input device then disabled. At this same time (CLK edge) the input device state is forced on the SOD 21 line by the control logic 33 for one clock cycle for transmission back to the SIOC 12. When the IIOC control logic 33 has transmitted the appropriate number of packets of data, it then disables the SOD driver and is prevented from being readdressed until the next framing pulse 29 is received. For the analog device ( FIG. 8) the value sent back on the SOD line represents the analog voltage level on the input to the module whereas for the digital device the value sent back indicates the input device state i.e., "on" or "off".

This communications process, from module to control logic, results in the input device state data (SOD) 21 sent back to the controller being delayed by one CLK signal 26 cycle from the output device state data (SID) sent to the module. This offset or delay of the data being received by the module (SID) from the data being transmitted by the module (SOD) is valuable in performing diagnostic turnaround.

The diagnostic turnaround mode is entered by all IIOC modules by detecting that SID 22 was simultaneously placed in the 'high'(5 volt) state (Diagnostic T/A bit 39 seen in FIG. 5, by the SIOC 12 during the reset interval of the CLK signal. The detection of the turnaround mode is accomplished by each module by sampling the SID on the falling edge of the reset level of the CLK signal. If SID is a high state at this time, the module control logic 33 recognizes this as the diagnostic turnaround mode for the following frame of data. Therefore all modules enter the diagnostic mode simultaneously and remain in the diagnostic mode until SID is found to be in the 'low'(0 volt) state during the framing level of the CLK signal. The SIOC 12 therefore can keep the modules in the diagnostic turnaround mode for one or more frames of data or continuously if desired. Once the diagnostic mode has been entered each module control logic 33 disables the sampling of its input devices INA/INB and instead internally connects the output driver 41 to its corresponding input device interface circuit 43 for transmission back to the controller. Thus correct operation of the output drive, the corresponding input interface circuit, as well as communications between the module and SIOC 12 can be verified. It can be shown, in the case of the analog device, that by incorporating an accurate reference either in the device or in the external device being controlled (i.e. xerographic power supply) that this method of diagnostic turn around can also be used to correct for analog signal inaccuracies that could occur, for example,between the controller and a xerographic power supply that it may be controlling. The offset of data by one CLK pulse 26 from SID to SOD enables verification of the module within one frame interval. Thus the diagnostic mode can be entered and exited without significantly disturbing the system.

Figure 7:
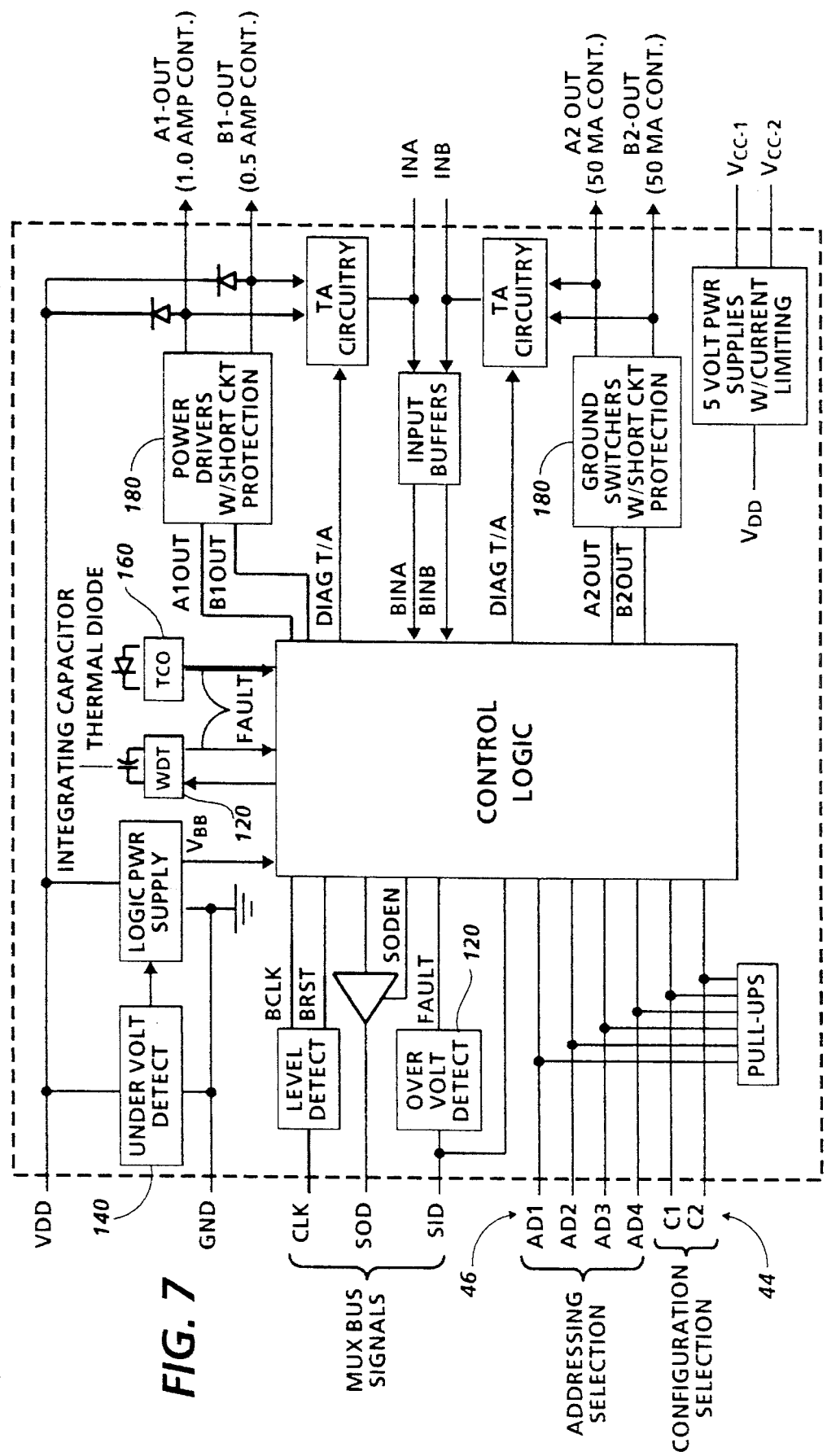
FIG. 7 is a Integrated circuit diagram of the digital configuration in accordance with the present invention.
Figure 8:
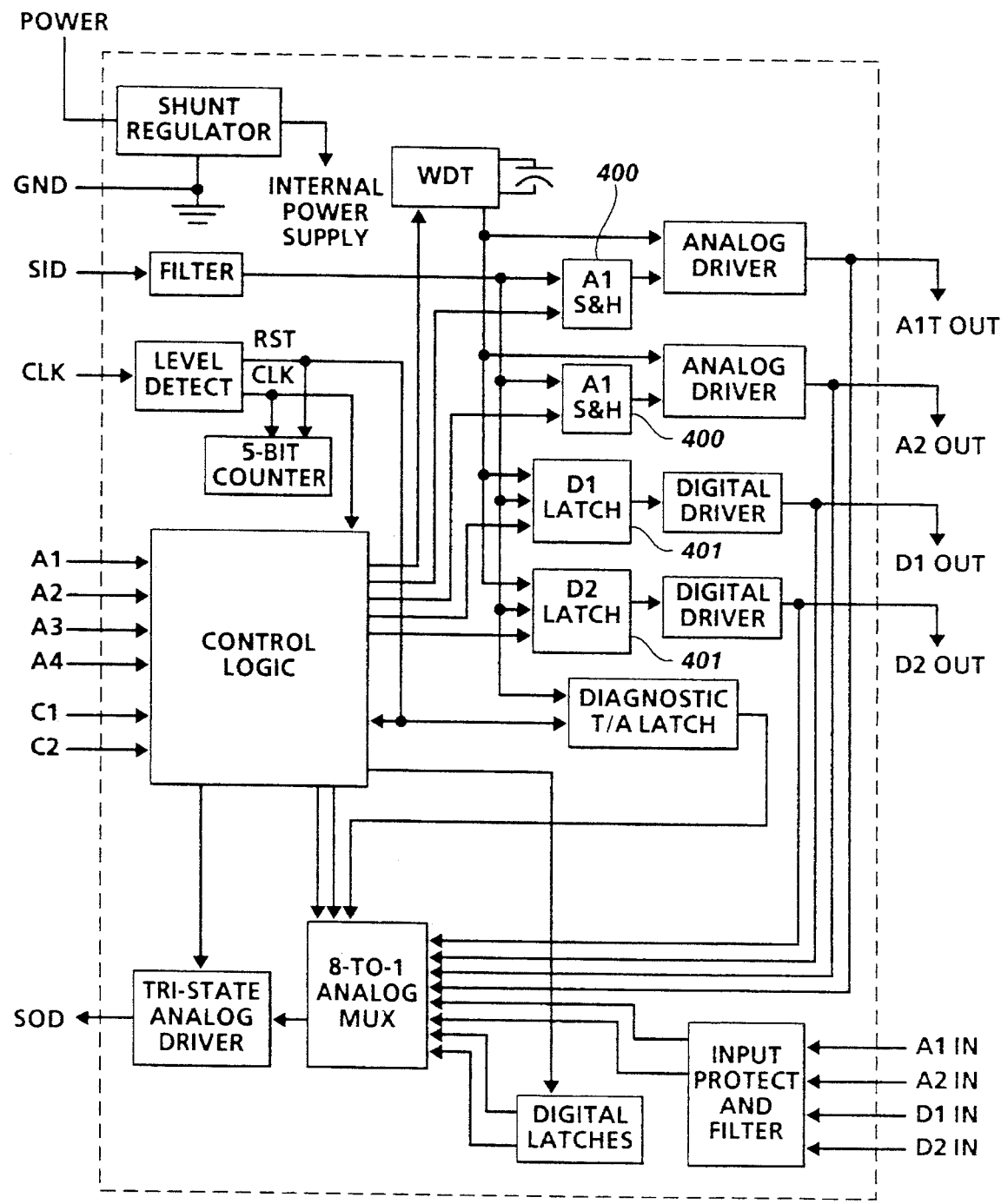
FIG. 8 is a Integrated circuit diagram of the analog configuration in accordance with the present invention.
Figure 9:
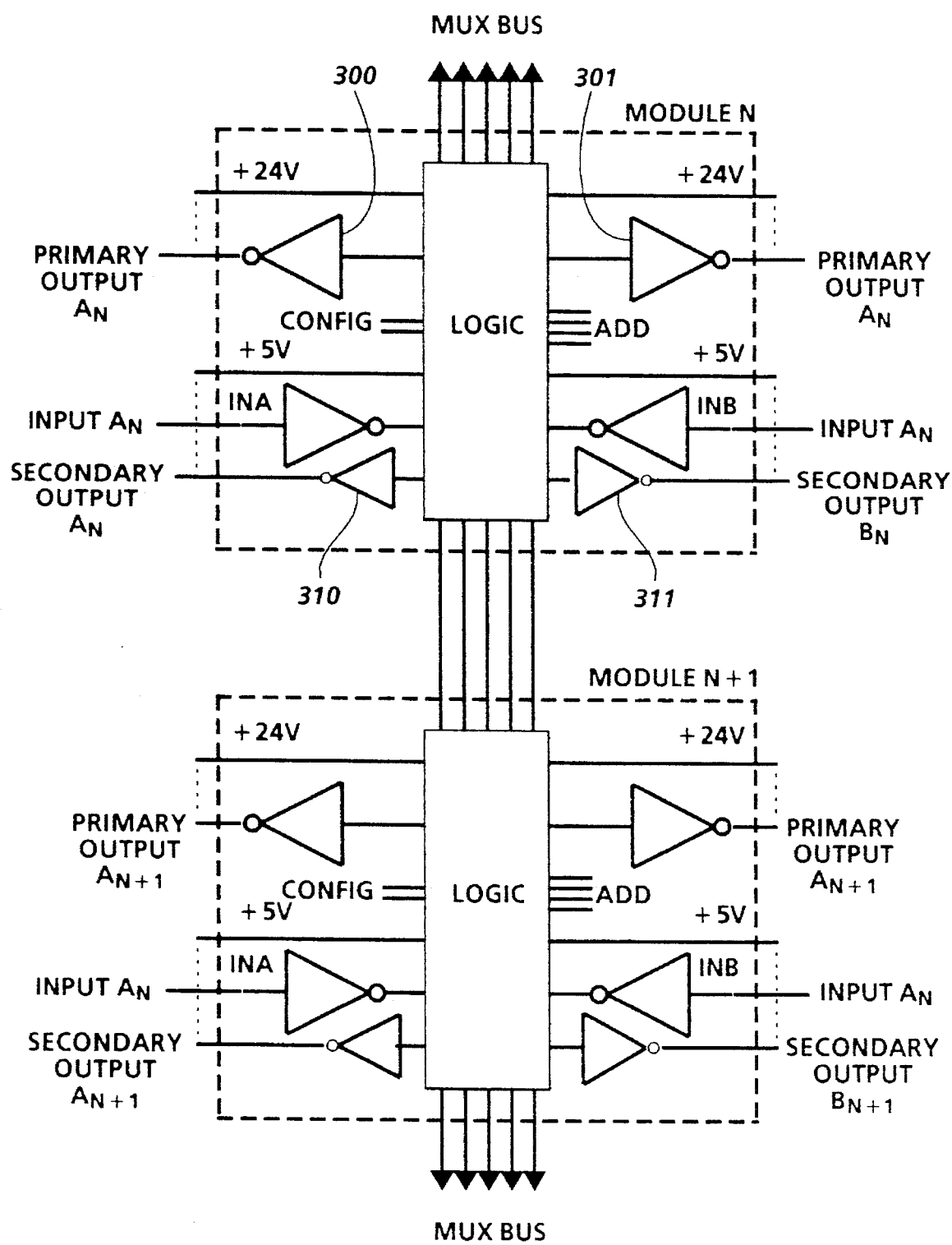
FIG. 9 is a typical module schematic in accordance with the present invention.

To protect itself, and the system to which it is connected, the module has incorporated within it's chip means to detect and protect against destruction faults. To avoid destructive states of the system that could occur when communications between the controller and a module are lost a watch dog timer (WDT) 120, FIG. 7, is included in the logic of the IC 62. The watch dog timer 120 causes all output devices to be disabled and communications on the SOD to be discontinued if the module is not addressed within an appropriate time interval the (WDT) 120 time is short enough to prevent damage to the systems loads, yet long enough to allow the controller to gain control of the TDM busses 18 if it should recover communications. In the case of an analog module this means that the output drivers are forced to 0v and SOD disabled. In the case of the digital device FIG. 9 the drivers are simply turned off and SOD disabled.

The IIOC module 20 is also provided with self protection circuitry to detect and shut down under low voltage supply, (Under Voltage Detection 140); FIG. 7, excessive operating temperatures, (TCO-Thermal cut-out 160), SID over voltage detection 170 as well as to protect against short circuits to the outputs drivers 180 . The module reacts to the thermal cut-out and SID overvoltage faults the same as it does to WDT 120 timing out except that the fault must be removed before recovery can occur. In the short circuit condition, only the driver with the short is disabled,. but if the short persists for an extended period of time, the thermal cut out fault will eventually occur.

Programming of the IIOC module for its address and configuration is accomplished by grounding or leaving open circuit the appropriate inputs to the IC chip 62. By grounding all address inputs 46 (FIG. 7) to the IIOC IC, the address assigned to that particular module would be address '0'. The IC use these inputs to compare to the clock count that has been accumulated. The sequence of address detection by control logic 33 is begun by each IIOC IC clock counter being reset by the framing pulse. As the counter accumulates clock counts it is compared to the address inputs. When the accumulated count equals the programmed address input, the control logic 33 begins sampling data from the SID and continues to do so until the end of address is detected. The end of address is determined by both the address inputs and the configuration inputs.

The configuration inputs 44, FIG. 7 are used to select how many I/O's are to be used by the module, which I/O channel will be used, and for what purpose the I/O will be used. In the case of the digital module, the choice for selection for output drivers in the preferred implementation are two drivers (both primary drivers 300 and 301 FIG. 9), three drivers (both primary drivers and either secondary driver 310 or 311) or all four outputs (both primary drivers and both secondary drivers 310 and 311). The above output selection defaults the input configuration correspondingly as two inputs (INA 35 and INB 37), one input INA or INB, or no inputs. In the preferred implementation of the analog version the choices are one analog input/output channel with an even address (i.e. 0, 2, 4, etc.), one analog input/output channel with an odd address (i.e. 1, 3, 5, etc.), or both analog input/output channels. The module address and configuration, in the preferred embodiment, are programmed at the time it is installed on a MUX BUS or at the time of replacement. Since its position on the bus is what makes it unique, in a system, by delaying the programming until that time allows all the modules, that are not programmed, to be identical.

While there has been illustrated and described what is at present considered to be a preferred embodiment of the present invention, it will be appreciated that numerous changes and modifications are likely to occur to hose skilled in the art, and it is intended in the appended claims to cover all those changes and modifications which fall within the true spirit and scope of the present invention.

We claim:

1. An interface and connector system in an imaging machine comprising:

a plurality of connector devices, each connector device electrically connected to load devices, a control connected to the plurality of connector devices, the control including timing means defining a time frame, a time division, multiplex bus interconnected to the control and to the connector devices, the bus including a discrete clock line and a plurality of data lines, the control and connector devices simultaneously exchanging data within the time frame, each connector device communicating with the control during a designated time slot within the time frame, the timing means including means to provide first voltage level clock pulses defining a clock cycle and second voltage level framing pulses, the framing pulses being determined by a change in voltage level of the clock pulses, each time frame being determined by the framing pulses, the clock pulses designating the beginning and end of a packet of data within a designated time slot.

2. The system of claim 1 including:

means for synchronizing communication between the control and the plurality of connector devices during said time frame by raising the voltage level of a clock pulse to the framing pulse level for one half cycle, the connector devices simultaneously detecting the framing pulse level, means for each of the plurality of connector devices to set detection logic in response to detecting the framing pulse level, means to detect the rising level of a first clock pulse to convey a first packet of data on said bus during a first designated time slot within said time frame, and means for one of said plurality of connector devices to sample the first packet of data on the trailing edge of said first clock pulse.

3. The system of claim 2 including means to detect the rising level of a second clock pulse to convey a second packet of data on said bus during a second designated time slot within said time frame, and means for one of said plurality of connector devices to sample the second packet of data on the trailing edge of said second clock pulse.

4. The system of claim 2 wherein the means for synchronizing includes means for initiating and terminating communication between the control and the plurality of connector devices during said time frame by raising the voltage level of a clock pulse to the framing pulse level for one half cycle, the connector devices simultaneously detecting the framing pulse level.

5. An interface and connector system comprising:

a plurality of connector devices, each connector device electrically connected to load devices, a control with timing means connected to the plurality of connector devices, each connector device communicating with the control during a designated time slot within a time frame, a time division, multiplex bus interconnected to the control and to the connector devices for simultaneously conveying data to and from the control and the connector devices within said time frame, the timing means including means to provide first voltage level clock pulses defining a clock cycle and second voltage level framing pulses, the framing pulses being determined by a change in voltage level of the clock pulses, each time frame being determined by the framing pulses, the clock pulses designating the beginning and end of data within a designated time slot.

6. The system of claim 5 wherein the conveying of data from a given connector device to the control is offset by one clock cycle from the conveying of data from the control to said given connector device.

7. The system of claim 5 wherein the timing means includes means to detect the rising level of a first clock pulse to convey a first packet of data on said bus during a first designated time slot within said time frame and means for a given connector device to sample the first packet of data on said bus on the trailing edge of said first clock pulse during said first designated time slot within said time frame.

8. The duplex interface and connector system of claim 5 including means for initiating a diagnostic mode for verifying communications between the the control and the plurality of connector devices.

9. The duplex interface and connector system of claim 8 wherein the means for initiating a diagnostic mode for verifying communications includes means for each of the connector modules initiating the diagnostic mode simultaneously.

10. The duplex interface and connector system of claim 8 wherein each of the connector modules includes an output drive and input interface including means for interconnecting the output driver to the input interface for transmission back to the control.

11. The duplex interface and connector system of claim 8 including means for a each connector to disable the sampling of load devices.

12. The duplex interface and connector system of claim 8 including an output data line wherein the means for initiating a diagnostic mode for verifying communications includes means for detecting both a high signal on said output data line and a framing pulse.

13. The duplex interface and connector system of claim 12 including means for the system to remain in the diagnostic mode until the detection of both a low signal on said output data line and a framing pulse.

14. An interface and connector system comprising:

a plurality of connector devices, each connector device electrically connected to load devices, a control with timing means connected to the plurality of connector devices, each connector device communicating with the control during a designated time slot within a time frame, a time division, multiplex bus interconnected to the control and to the connector devices for concurrently conveying data to and from the control and the connector devices within said time frame, the bus including at least one input and one output line, and means to provide clock pulses including first level clock pulses defining a clock cycle and second level clock pulses defining a time frame, each time frame being determined by the second level clock pulses, the clock pulses designating data within a designated time slot within a given time frame on the input and output lines for a given connector device, the control including watch dog timer means to arrest communications on the multiplex bus upon the detection of the failure of communications between the control and a connector device within a given period of time.

15. The interface and connector system of claim 14 wherein the watch dog timer means includes means to determine the failure to designate a connector device within a given period of time including means to disable predetermined load devices.

16. The interface and connector system of claim 15 including means to automatically recover from the detection of the failure of communications between the control and a connector device within a given period of time.

17. The interface and connector system of claim 14, the control including protection circuitry to arrest operation of the system upon detection of system low voltage.

18. The interface and connector system of claim 14, the control including protection circuitry to arrest operation of the system upon detection of excessive operating temperatures.

19. The duplex interface and connector system of claim 14 including load driving circuits, the control including protection circuitry to arrest operation of the system upon detection of malfunctions in the load driving circuits.

* * * * *